L. T. OLSON.
DUMPING APPARATUS.
APPLICATION FILED NOV. 12, 1914.
1,255,038.
Patented Jan. 29, 1918.
3 SHEETS—SHEET 1.
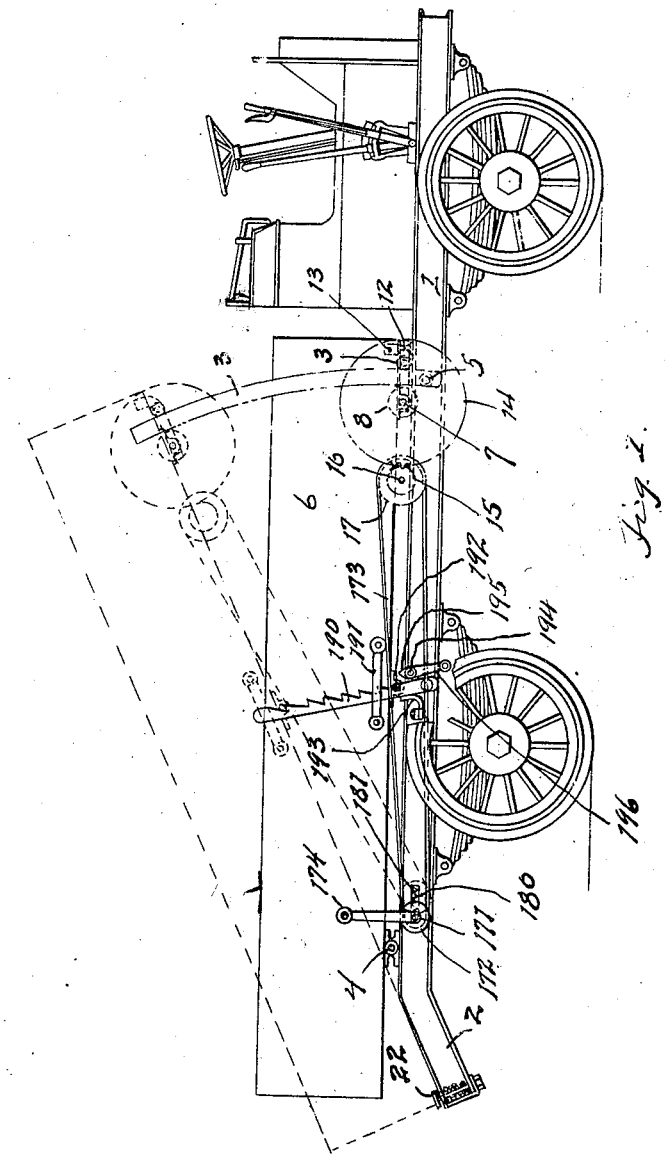
WITNESSES:
INVENTOR.
LOUIS T. OLSON
BY
ATTORNEY.

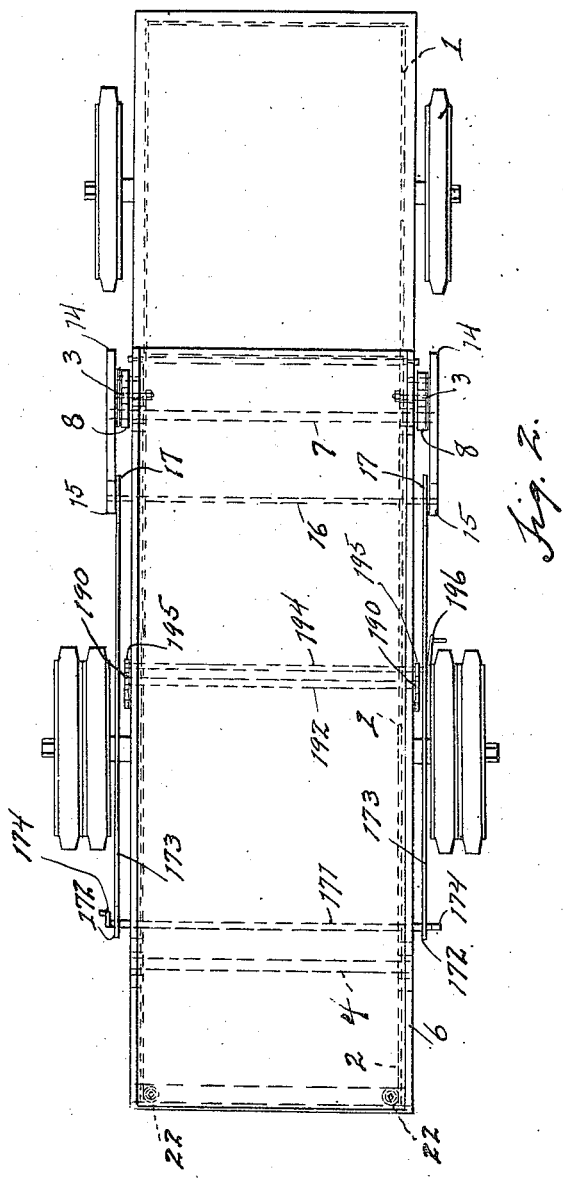

L. T. OLSON.
DUMPING APPARATUS.
APPLICATION FILED NOV. 12, 1914.

1,255,038.

Patented Jan. 29, 1918.
3 SHEETS—SHEET 3.

WITNESSES:

INVENTOR.
Loves T. Olson

BY
ATTORNEY.

UNITED STATES PATENT OFFICE.

LOUES T. OLSON, OF DETROIT, MICHIGAN.

DUMPING APPARATUS.

1,255,038.  Specification of Letters Patent.  Patented Jan. 29, 1918.

Application filed November 12, 1914. Serial No. 871,657.

*To all whom it may concern:*

Be it known that I, LOUES T. OLSON, a citizen of the United States, residing at Detroit, county of Wayne, State of Michigan, have invented a certain new and useful Improvement in Dumping Apparatus, and declare the following to be a full, clear, and exact description of the same, such as will enable others skilled in the art to which it pertains to make and use the same, reference being had to the accompanying drawings, which form a part of this specification.

This invention relates to dumping apparatus adaptable for use with vehicles of various types, as an automobile or horse drawn vehicle, and has for its object a vehicle body adapted to be raised to or lowered from dumping position and automatically locked at any desired angle within its range of movement.

A further object of the invention resides in the mechanism employed in raising and lowering the body moving therewith and adapted to be operated manually by an operator standing on the ground.

A further object of the invention resides in the provision of yieldable means for limiting the upward movement of the end of the body or box which is also adapted to prevent a displacement of the vehicle body during the dumping operation that would otherwise naturally result from a movement of the material in the box toward the rear end thereof. These and further objects and novelties of the invention are hereinafter more fully described and claimed and shown in the accompanying drawings in which—

Figure 1 is a side elevation of an embodiment of my dumping apparatus as applied to the chassis of an automobile.

Fig. 2 is a plan view thereof.

Similar characters refer to similar parts throughout the drawings and specification.

Figure 4:
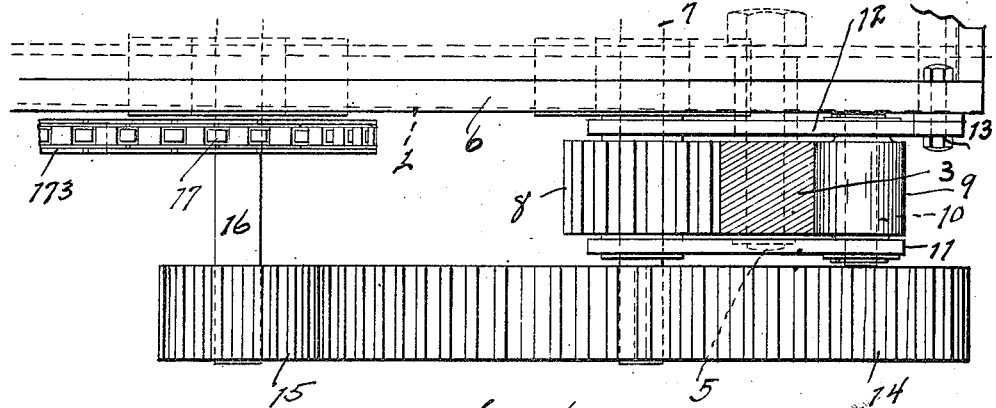
Fig. 4 is a plan view of such mechanism.

While in the illustration of the embodiment of the invention it is shown as applied to the chassis of an automobile, it will be readily understood by those familiar with the art that the device is equally applicable for use with vehicles of various other types, it simply being necessary to provide a frame of the proper shape to support the vehicle box. 1 indicates a horizontally positioned frame supported in any convenient manner upon the running gear of a vehicle and provided with an angularly disposed rear portion 2, the angle of which is equal to the angle assumed by the box when raised to its highest position as shown by dotted lines in Fig. 1. Attached to the side frame members 1, 1 upon each side of the vehicle, is an upwardly extending rack 3, 3 having a radius practically equal to the distance of the rack from the hinge shaft 4 of the body, which shaft is located near the rear of the body, but some little distance therefrom. The racks 3 are pivotally secured to the frame 1 at 5 to allow slight movement thereof. Supported by means of brackets near the forward end of the box 6 is a shaft 7 extending crosswise of the box and provided with like gears 8, 8 near opposite ends thereof adapted to engage the rack members 3, 3 and, as more fully shown in Figs. 3 and 4, a roller 9 is rotatably mounted on a shaft 10, which shaft is held in the plates 11 and 12 passing upon opposite sides of the rack 3 and mounted upon the shaft 7 at one end, the opposite end of the bar 12 being secured at 13 to the vehicle box. By this arrangement the racks 3, 3 are at all times held in engagement with the gears 8, 8.

On opposite ends of the shaft 7 are also secured the comparatively large gears 14 which mesh with a gear 15 on a shaft 16 carried in brackets on the box and extending crosswise thereof. Mounted on the shaft 16 between each gear 15 and the body are sprocket wheels 17, 17. A shaft 171 is mounted in the frame of the machine near the pivot point of the box and on the shaft on opposite sides of the box are secured the sprockets 172, 172 provided with sprocket chains 173, 173 running over the sprocket wheels 17 and 17. The shaft 171 is provided with a crank 174 by means of which the sprockets and gear train may be operated. As the shaft 171 is not situated at the pivot point of the box, it is necessarily mounted in slots 180 in the frame 1 on each side and a spring 181 is provided tending to hold the shaft at the rear end of the slot. As the box is raised and the relative position of the sprockets 17 and 172 altered, the shaft 171 may draw forward in the slots against the spring which keeps the sprocket chains taut at all times.

In order that the box may be automatically locked in position, a notched bar 190 is pivoted on each side of the chassis frame. The upper ends of these bars ride in stirrups 191 on the box preventing lateral displacement thereof and of such length as to allow relative movement of the bar longitudinally of the box. A rod 192 is secured beneath the body having ends projecting across the notched edge of the bars 190. A spring 193 is mounted on the frame tending to hold the notched edge of the bar 190 against the rod 192 and is thus in position to engage the said bar and hold the box from descending. A rod 194 is also mounted on the chassis frame having pawls 195 engaging against the edge of the bar on the opposite side from the spring 193. The shaft 194 is provided with a crank 196 by means of which it may be turned and the notches of the bar disengaged from the rod 192 when it is desired to lower the body with the crank 174 on the sprocket shaft 171.

As before stated the box is pivotally supported on the frame 1 by means of a shaft 4 extending through companion bearings on the box and frame respectively which prevents endwise movement of the box when in its elevated position and, by the angular extensions 2 on the frame 1, the rear end of the box beyond the pivot bearings is supported when the box is raised to its fullest extent. By such arrangement, the weight of the material rolling out of the back end of the box cannot raise the forward end thereof as with some other devices of like nature. In order that the box may not be suddenly brought to rest on the extension 2 by reason of the weight of material passing out of the end of the box, I have provided spring restrained plungers 22 upon opposite sides of the frame near the extreme end of the extensions which are first engaged by the end of the box and tend to lessen the jar produced by sudden engagement of the box with the extension 2 and these plungers tend to raise the rear end of the box after the greater portion of the material has passed therefrom.

Figure 3:
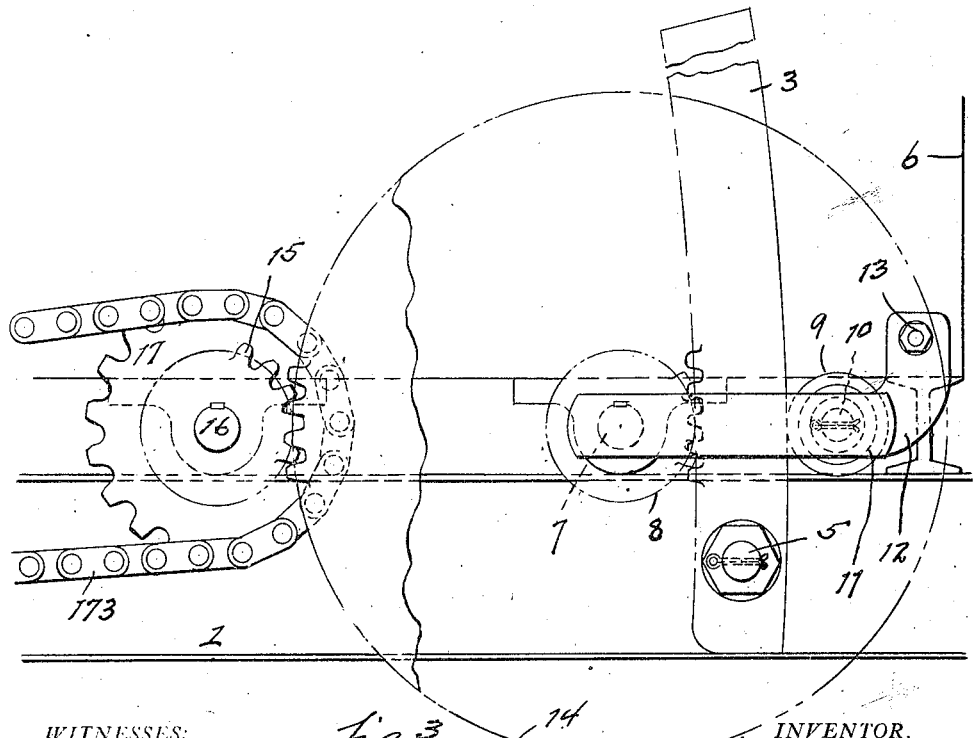
Fig. 3 is an enlarged side elevation partly in section showing the mechanism employed in raising and lowering the front end of the body.

As shown more fully in Figs. 2 and 3, the gear train utilized in raising and lowering the box, is in duplicate upon opposite sides thereof as are also the operating sprockets on the frame so that the box may be raised or lowered from either side of the vehicle as may be most convenient.

In operation rotation of either crank 174 and corresponding rotation of the sprockets and gear trains raises the front end of the box to such height as is necessary for the box to empty by gravity, which height is discernible by the operator by reason of his position near the rear end of the box, which height is necessarily greater with some materials than with others and, when the box has been raised to the desired height, the notched bars 190 automatically engage the rod 192 holding the box at the desired angle but in no event can the gear 8 be drawn upward past the end of the racks 3, 3 as the rear end of the box engages against the angular extensions on the frame before the gear has reached the upper end of the rack and by this arrangement breakage of the parts from such cause is avoided.

Having thus briefly described my invention and its mode of operation, what I claim and desire to secure by Letters Patent of the United States is—

1. In apparatus of the character described, in combination with a frame having an angularly disposed depending rear portion, of a box hinged between the ends thereof to the frame adjacent the angularly disposed portion, companion gear trains attached to the box and racks on the frame for elevating the forward end of the box, sprockets carried on the frame having chains for operating the gear trains, and locking means for maintaining the box in an elevated position.

2. In apparatus of the character described, in combination with a frame having an angularly disposed depending rear portion, of a box hinged between the ends thereof to the frame adjacent the angularly disposed portion, and means for raising or lowering the forward end of the box comprising, curved rack bars pivotally supported by the frame and extending upwardly each side of the box, a shaft secured to the box, gears thereon meshing with the rack bars, a roller engaging each rack bar upon the side opposite the said gear, a frame for each roller adapted to hold the roller in its proper position relative to its companion gear, a gear train on each side of the box for rotating said gear shaft, sprocket wheels carried by the frame having chains for operating the gear trains, said sprockets being movably mounted on the frame and springs yieldably holding the sprockets from movement.

3. In apparatus of the character described, in combination, a frame having an angularly disposed depending rear portion, a box adapted to discharge a load by gravity at the rear end hinged between the ends thereof to the frame adjacent the angularly disposed portion, spring bumpers carried by said angularly disposed portion engaged by the rear end of the box when elevated; means for raising or lowering the forward end of the box comprising, curved rack bars pivotally supported by the frame and extending upwardly each side of the box, a shaft secured to the box, gears thereon meshing with the rack bars, means for maintaining the rack bars in engagement with said gears, a gear on each end of said shaft adjacent the first named parts, a second shaft carried by the box, a gear adjacent each end thereof meshing with said last named gears, a sprocket wheel on said second shaft adjacent each side of the box near the forward end, a second set of sprocket wheels movably mounted on the frame near the rear end, sprocket chains connecting the rear sprocket wheels with the forward ones, a crank for jointly operating the rear set of sprocket wheels, a pair of notched bars on each side of the box pivoted to the frame, means on the box adapted to engage said notches when the box is raised, a spring for holding each bar in contact with the engaging means, and means for releasing said bars.

4. In apparatus of the character described, in combination, a frame having an angularly disposed depending rear portion, a box adapted to discharge a load by gravity at the rear end hinged between the ends thereof to the frame adjacent the angularly disposed portion, spring bumpers carried by said angularly disposed portion engaged by the rear end of the box when elevated; means for raising or lowering the forward end of the box comprising, curved rack bars pivotally supported by the frame and extending upwardly each side of the box, a shaft secured to the box, gears thereon meshing with the rack bars, means for maintaining the rack bars in engagement with said gears, a gear on each end of said shaft adjacent the first named parts, a second shaft carried by the box, a gear adjacent each end thereof meshing with said last named gears, a sprocket wheel on said second shaft adjacent each side of the box near the forward end, a second set of sprocket wheels movably mounted on the frame near the rear end, sprocket chains connecting the rear sprocket wheels with the forward ones and a crank for jointly operating the rear set of sprocket wheels.

In testimony whereof, I sign this specification in the presence of two witnesses.

LOUES T. OLSON.

Witnesses:
 CHARLES E. WISNER,
 EMENS B. WISNER.